(12) United States Patent
Liu et al.

(10) Patent No.: US 6,447,136 B1
(45) Date of Patent: Sep. 10, 2002

(54) LIGHT GUIDE PLATE FOR A BACKLIGHT SYSTEM

(75) Inventors: Ming-dah Liu; Shi-chi Hou; Gin-wen Hsieh; Bor-jyh Pan, all of Hsinchu (TW)

(73) Assignee: Coretronic Corporation, Hsinchu (TW)

( * ) Notice: Subject to any disclaimer, the term of this patent is extended or adjusted under 35 U.S.C. 154(b) by 0 days.

(21) Appl. No.: 09/634,338

(22) Filed: Aug. 8, 2000

(51) Int. Cl.[7] .................................................. F21V 7/04
(52) U.S. Cl. .............................. 362/31; 362/26; 362/146
(58) Field of Search ....................... 362/26, 31; 385/146

(56) References Cited

U.S. PATENT DOCUMENTS 5,377,084 A * 12/1994 Kojima et al. ................ 362/31
5,961,198 A * 10/1999 Hira et al. ..................... 362/31

* cited by examiner

Primary Examiner—Sandra O'Shea
Assistant Examiner—Guiyoung Lee
(74) Attorney, Agent, or Firm—Winston Hsu

(57) ABSTRACT

In a backlight system of a liquid crystal display, a light guide plate includes a plurality of reflector units. The light guide plate is in wedge or flat shape, which has a front surface, a back surface, and four side surfaces. The plurality of reflector units are integrally formed with the back surface of the light guide plate, each of which is designed as an annular protrusion. Through one of the four side surfaces, a light beam irradiated by a lamp propagates into the light guide plate. Regardless of the propagating direction, part of the light beam is reflected by the reflector unit into two reflective light beams that are then refracted out of the front surface of the light guide plate. Therefore, the light guide plate according to the present invention achieves an excellent reflective efficiency.

6 Claims, 5 Drawing Sheets

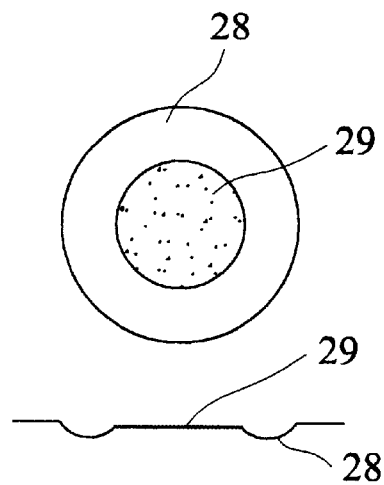
Fig. 8(a)
Fig. 8(b)
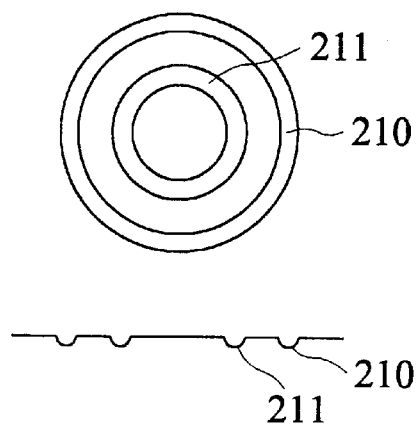
Fig. 9(a)
Fig. 9(b)
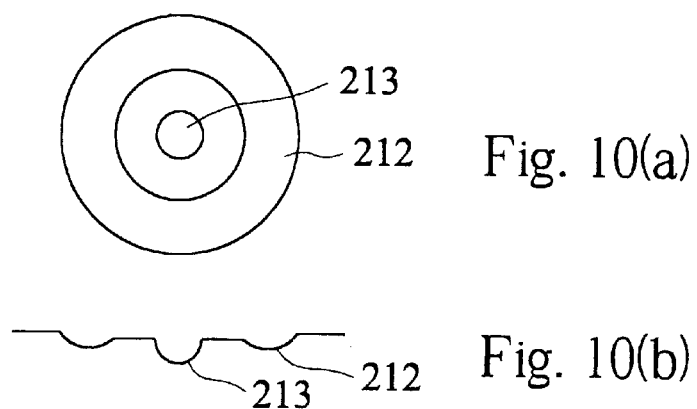
Fig. 10(a)
Fig. 10(b)

LIGHT GUIDE PLATE FOR A BACKLIGHT SYSTEM

BACKGROUND OF THE INVENTION

1. Field of the Invention

The present invention relates to a light guide plate, and more particularly to a light guide plate for a backlight system used in a liquid crystal display.

2. Description of the Related Art

For the sake of comparison, a conventional backlight system of a liquid crystal display will be previously described in the following with reference to FIGS. 1 to 3.

Referring to FIG. 1, a conventional backlight system of a liquid crystal display includes a lamp 11, a light guide plate 12, a lamp reflector 13, and a back reflector 14.

The lamp 11 is used as a light source to provide the backlight system with the necessary light beams.

The light guide plate 12 has a front surface 121, a back surface 122, and a side surface 123 that is adjacent to the lamp 11. In addition, the side surface 123 is disposed to be parallel with the lamp 11 so as to receive the light beams irradiated by the lamp 11. The back surface 122 is provided with a plurality of reflector dots 124, each of which is designed as a hemispherical protrusion.

The lamp reflector 13 is disposed to surround the lamp 11 in such a way that the light beams irradiated by the lamp 11 is reflected toward the light guide plate 12.

The back reflector 14 is disposed on the back surface 122 of the light guide plate 12 to thereby reflect back the light beams transmitting out of the back surface 122 of the light guide light 12.

As shown in FIG. 1, in normal situations, a light beam B irradiated from the lamp 11 through the side surface 123 into the light guide plate 12 is totally reflected back and forth between the front surface 121 and the back surface 122 in such a way of propagating away from the lamp 11. In this case, there are no light beams refracted out of the front surface 121 of the light guide plate 12. However, if a light beam A irradiated from the lamp 11 hits against any of the reflection dots 124 during propagating, a reflective light beam A1 refracts out of the front surface 121 as a result of a change of the reflective angle of the light beam A. With the disposition of the reflector dots described above, the backlight necessary for a panel 17 of the liquid crystal display is thereby provided.

As a conventional method for fabricating the reflector dots 124 of the light guide plate 12, a halftone printing process is used to print a high reflective material over the back surface 122 of the light guide plate 12, thereby forming the reflector dots 124. Undesirably, the manufacturing of the back light system used in the liquid crystal display takes a long time and costs expensively due to the requirement of the halftone printing process.

As another conventional method for fabricating the reflector dots 124 of the light guide plate 12, a plurality of reflector dots 124 are directly fabricated as an integral part of the light guide plate 12 on the back surface 122. For example, each of the reflector dots 124 may be shaped like a hemisphere, a trapezoid, a pyramid, or a half-moon. However, the trapezoid and half-moon reflector dots only reflect out of the front surface 121 the incident light beams propagating in a certain direction. Therefore, these reflector dots are not applicable to a condition that the incident light beams propagate in a number of directions. Although the hemispherical reflector dots are applicable to a condition that the incident light beams propagate in a number of directions, their ability to reflect and refract the light beams out of the light guide plate is still not optimum as described below.

Referring to FIGS. 2(a) and 2(b), each reflector dot 124 is designed as a hemispherical protrusion. Since each reflector dot 124 is no more than a single protrusion as observed in any directions, there is only a local reflection region capable of effectively reflecting and refracting the incident light beam out of the light guide plate. For example, only a local reflection region 126 is able to effectively reflect and refract out of the light guide plate the incident light beam propagating in the X direction. This is because only the local reflection region 126 can effectively change the reflective angle of the incident light beam propagating in the X direction.

Referring to FIG. 3, which is a three-dimensional view, when the light beam A hits against the reflection dot 124, only part of the light beam A is reflected as a reflective light beam A1 which is then refracted out of the front surface 121 of the light guide plate. Therefore, the reflecting efficiency of the conventional light guide plate still needs an improvement.

SUMMARY OF THE INVENTION

An object of the present invention is to provide a light guide plate for a backlight system, which is applicable to a condition that the incident light beams propagate in a number of directions and is able to effectively reflect and refract the incident light beams out of the front surface of the light guide plate.

In order to achieve the object described above, a light guide plate for a backlight system according to the present invention is disclosed. The backlight system consists of a light guide plate, a lamp, a lamp reflector, and a back reflector. The lamp reflector is disposed to surround the lamp for reflecting the light beams irradiated by the lamp toward the light guide plate. The light guide plate has a front surface facing a panel; four end surfaces, one of which is disposed to face the lamp; and a back surface on which the back reflector is disposed. The back surface of the light guide plate is integrally formed with a plurality of reflector units. Each of the plurality of the reflector units includes at least an annular protrusion.

With the disposition of the plurality of reflector units described above, the light guide plate effectively reflects the incident light beams into at least two reflective light beams which are then refracted out of the front surface even if the incident light beams propagate in a number of directions. Therefore, the light guide plate according to the present invention achieves an excellent reflective efficiency.

BRIEF DESCRIPTION OF THE DRAWINGS

The above and other objects, features, and advantages of the present invention will become more apparent from the following detailed descriptions of embodiments taken in conjunction with the accompanying drawings, wherein:

FIGS. 8(a) and 8(b) are a plane view and a side view, respectively, showing a reflector unit of a light guide plate of a second embodiment;

FIGS. 9(a) and 9(b) are a plane view and a side view, respectively, showing a reflector unit of a light guide plate of a third embodiment; and FIGS. 10(a) and 10(b) are a plane view and a side view, respectively, showing a reflector unit of a light guide plate of a forth embodiment.

DESCRIPTIONS OF PREFERRED EMBODIMENTS

First Embodiment

A backlight system with a light guide plate of a first embodiment according to the present invention will be described in detail with reference to FIGS. 4 to 7 in the following paragraphs.

Figure 1:
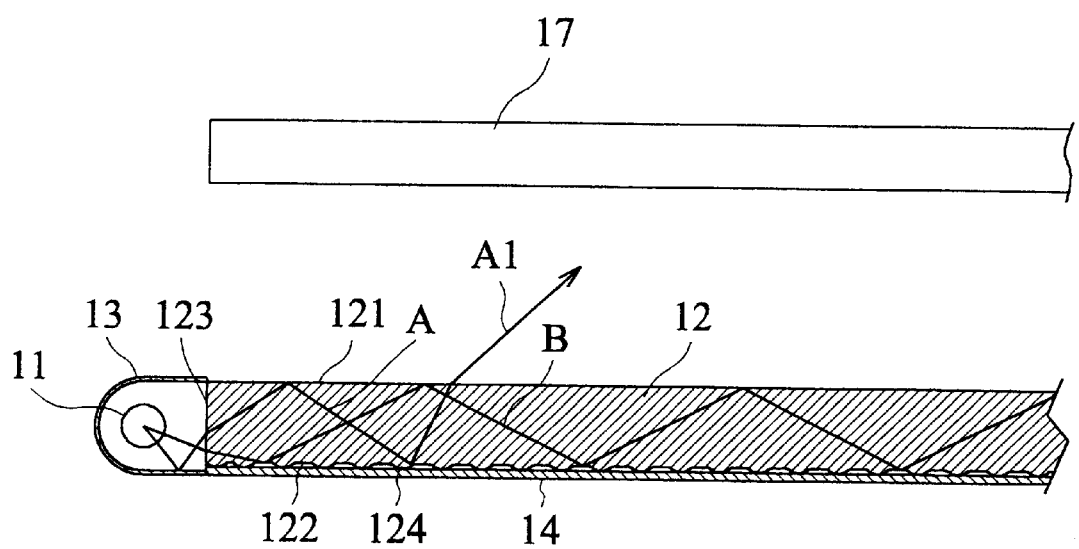
FIG. 1 is a cross-sectional view showing a conventional backlight system used in a liquid crystal display.
Figure 2A:
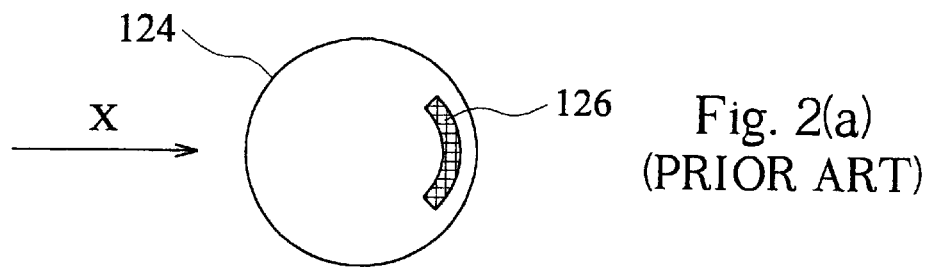
FIGS. 2(a) and 2(b) are a plane view and a side view, respectively, showing a conventional reflector dot of a light guide plate.
Figure 2B:
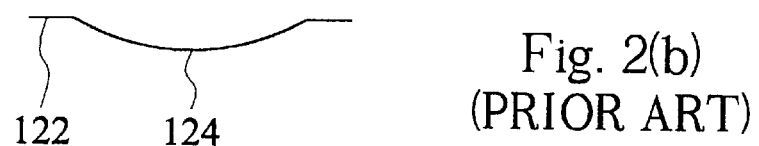
Figure 3:
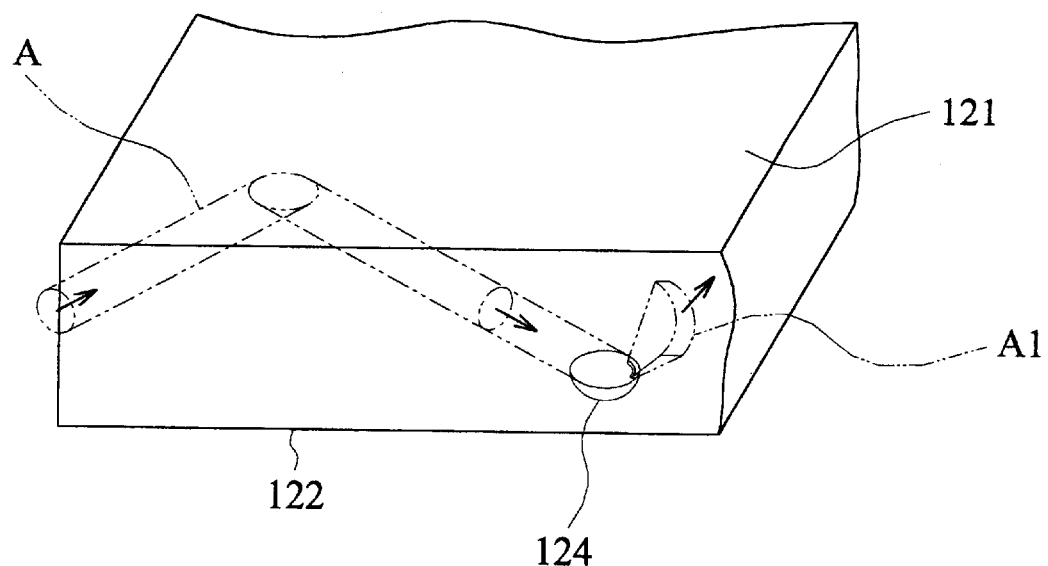
FIG. 3 is a three-dimensional view showing an effective reflection caused by a conventional reflector dot of a light guide plate.
Figure 4:
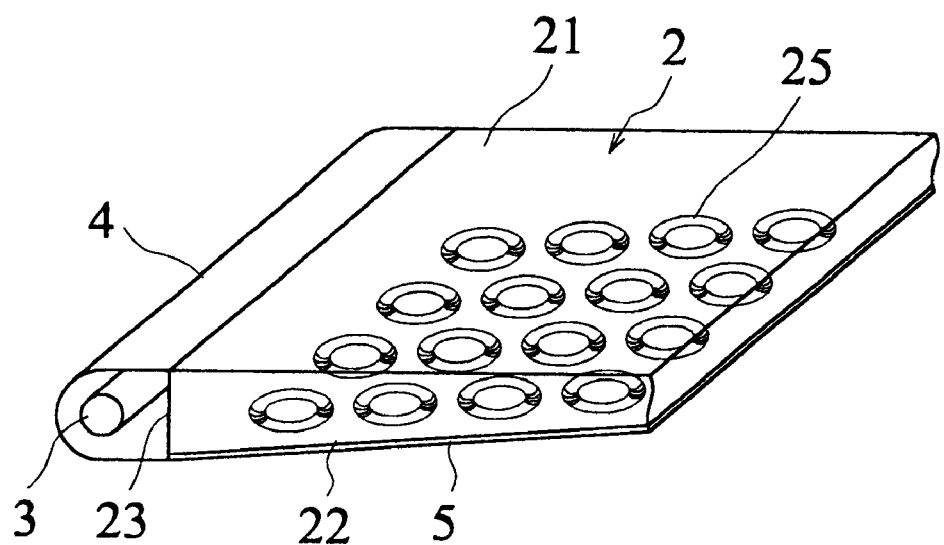
FIG. 4 is a perspective view showing a backlight system with a light guide plate of a first embodiment according to the present invention.

Referring to FIG. 4, a backlight system according to the present invention consists of a light guide plate 2, a lamp 3, a lamp reflector 4, and a back reflector 5.

The light guide plate 2 is made of a transparent material such as acrylic. In addition, the light guide plate 2 is in wedge or flat shape, which has a front surface 21, a back surface 22, and four side surfaces 23. There are a plurality of reflector units integrally formed with the back surface, each of which is shaped like an annular protrusion 25 in the first embodiment.

The lamp 3 is disposed adjacent to one of the four side surfaces 23 of the light guide plate 2. The lamp 3 is adapted to irradiate the light beams passing through the side surface 23 into the light guide plate 2.

The lamp reflector 4 is disposed to surround the lamp 3, thereby reflecting the light beams irradiated from the lamp 3 into the light guide plate 2.

The back reflector 5 is disposed to cover the back surface 22 of the light guide plate 2 so as to make the light beams transmitting out of the back surface 22 reflected back to the light guide plate 2.

Figure 5:
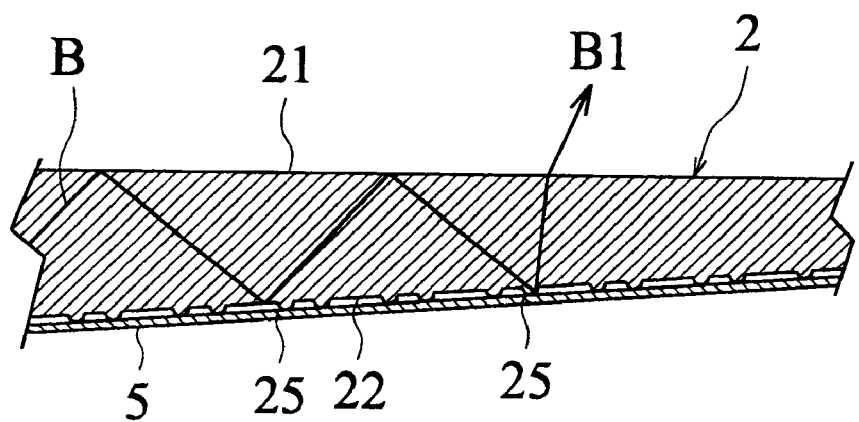
FIG. 5 is a cross-sectional view showing a backlight system with a light guide plate of a first embodiment according to the present invention.

Referring to FIG. 5, in normal situations, a light beam B irradiated from the lamp 3 into the light guide plate 2 is totally reflected back and forth between the front surface 21 and the back surface 22 in such a way of propagating away the lamp 3. In this case, there are no light beams refracted out of the front surface 21 of the light guide plate 2. However, if the light beam B hits against any of the annular protrusions 25, the reflective angle of the light beam B changes in such a way that a reflective light beam B1 refracts out of the front surface 21 of the light guide plate 2. With the disposition of the annular protrusions 25 described above, the backlight necessary for a panel of a liquid crystal display is thereby provided.

Figure 6A:
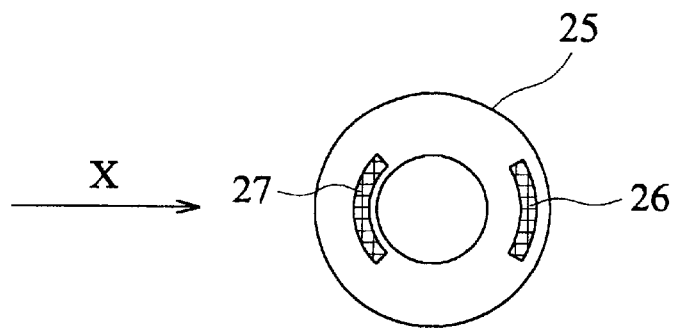
FIGS. 6(a) and 6(b) are a plane view and a side view, respectively, showing a reflector unit of a light guide plate of a first embodiment.
Figure 6B:
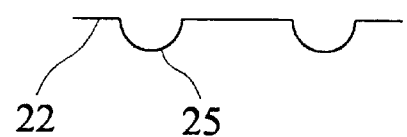

In the first embodiment, each annular protrusion 25 provides two arc portions as the local reflection regions regardless of the propagation direction of the incident light beam. More specifically, two arc portions 26 and 27 of the annular protrusion 25, as shown in FIG. 6, both reflect the light beam propagating in the X direction in such a way that the reflective light beam is then refracted out of the front surface 21 of the light guide plate 2.

Figure 7:
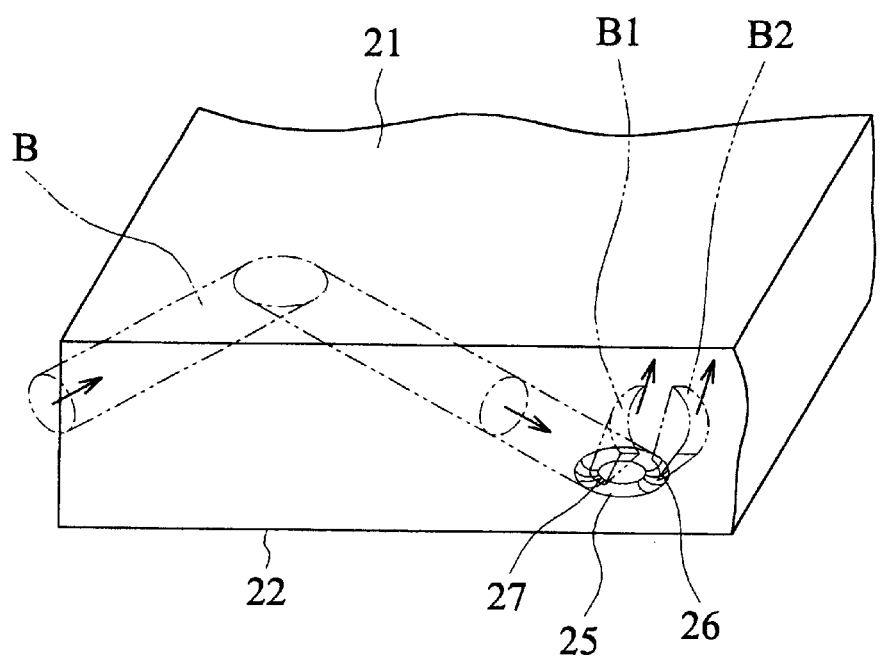
FIG. 7 is a three-dimensional view showing an effective reflection caused by a reflector unit of a light guide plate of a first embodiment.

Referring to FIG. 7, which is a three-dimensional view, when the light beam B hits against the annular protrusion 25, part of the light beam B is reflected by the two local reflection regions 26 and 27 into two reflective light beams B1 and B2. Then, the reflective light beams B1 and B2 are refracted out of the front surface 21 of the light guide plate 2. As a result, the annular reflector unit 25 achieves a better reflective efficiency than the conventional hemispherical reflector dot does.

Accordingly, the light guide plate of the first embodiment according to the present invention has the following advantages:

1. For a light beam propagating in any direction, the reflector unit provides two local reflection regions since it is in annular shape.
2. The reflective efficiency of the light guide plate is improved since an incident light beam is reflected into two light beams that are then refracted out of the front surface of the light guide plate.

Second Embodiment

FIGS. 8(a) and 8(b) are a plane view and a side view, respectively, showing a reflector unit of a light guide plate of a second embodiment according to the present invention. As shown in FIGS. 8(a) and 8(b), the reflector unit of the light guide plate includes an annular protrusion 28 and a rough surface 29 surrounded by the annular protrusion 28.

Third Embodiment

FIGS. 9(a) and 9(b) are a plane view and a side view, respectively, showing a reflector unit of a light guide plate of a third embodiment according to the present invention. As shown in FIGS. 9(a) and 9(b), the reflector unit of the light guide plate includes two concentric annular protrusions 210 and 211.

Fourth Embodiment

FIGS. 10(a) and 10(b) are a plane view and a side view, respectively, showing a reflector unit of a light guide plate of a forth embodiment according to the present invention. As shown in FIGS. 10(a) and 10(b), the reflector unit of the light guide plate includes an annular protrusion 212 and a hemispherical protrusion 213 surrounded by the annular protrusion 212.

While the invention has been described by way of example and in terms of the preferred embodiment, it is to be understood that the invention is not limited to the disclosed embodiment. To the contrary, it is intended to cover various modifications and similar arrangements as would be apparent to those skilled in the art. For example, the annular protrusion used as the reflector unit according to the present invention may be shaped like a circular ring protrusion, an ellipsoidal ring protrusion, a rectangular ring protrusion, a hexagonal ring protrusion, and the like. Therefore, the scope of the appended claims should be accorded the broadest interpretation so as to encompass all such modifications and similar arrangements.

What is claimed is:

1. A light guide plate for a backlight system having a lamp for irradiating light, a lamp reflector disposed to surround the lamp for reflecting light toward said light guide plate, and a back reflector, said light guide plate comprising:

a front surface disposed to face a panel;

four side surfaces, one of which is disposed to face the lamp; and a back surface on which the back reflector is disposed, said back surface being integrally formed with a plurality of reflector units, characterized in that at least one of said plurality of reflector units has at least one annular protrusion with rounded curve cross-sectional surface wherein, for light beams that impinge onto said protrusion and are originated from the lamp, at least two arc portions on said protrusion may reflect light toward the front surface.

2. A light guide plate according to claim 1, wherein said at least one of said plurality of reflector units has a first said protrusion and a second said protrusion whose size is smaller than that of said first protrusion, said second protrusion being surrounded by said first protrusion.

3. A light guide plate according to claim 2, wherein at least one of said plurality of reflector units has at least two concentric said protrusions.

4. A light guide plate according to claim 1, wherein at least one of said plurality of reflector units has a surface region surrounded by said protrusion, and said surface region is formed as a rough surface.

5. A light guide plate according to claim 4, wherein said surface region has a rounded curve surface portion.

6. A light guide plate according to claim 5, wherein said rounded curve surface portion is a hemispherical surface.

* * * * *